(12) United States Patent
Moskowitz et al.

(10) Patent No.: US 8,896,220 B2
(45) Date of Patent: Nov. 25, 2014

(54) HIGH EFFICIENCY, LOW ENERGY STORAGE DRIVER CIRCUIT FOR SOLID STATE LIGHT SOURCES

(75) Inventors: Philip E. Moskowitz, Georgetown, MA (US); Warren P. Moskowitz, Ipswich, MA (US)

(73) Assignee: OSRAM SYLVANIA Inc., Danvers, MA (US)

( * ) Notice: Subject to any disclaimer, the term of this patent is extended or adjusted under 35 U.S.C. 154(b) by 340 days.

(21) Appl. No.: 13/413,024

(22) Filed: Mar. 6, 2012

(65) Prior Publication Data

US 2012/0229037 A1    Sep. 13, 2012

Related U.S. Application Data

(60) Provisional application No. 61/449,982, filed on Mar. 7, 2011.

(51) Int. Cl.
*H05B 37/02* (2006.01)
*H05B 33/08* (2006.01)

(52) U.S. Cl.
CPC .......... H05B 33/083 (2013.01); H05B 33/0887 (2013.01); *Y02B 20/341* (2013.01)
USPC .................... 315/192; 315/185 R; 315/209 R; 315/291; 315/308; 315/312

(58) Field of Classification Search
CPC .. H05B 37/02; H05B 33/083; H05B 33/0887; H05B 33/0809; H05B 33/089; H05B 33/0815; H05B 33/0824
USPC ...... 315/185 R, 192, 200 R, 209 R, 224, 225, 315/226, 291, 307, 308, 312
See application file for complete search history.

(56) References Cited

U.S. PATENT DOCUMENTS

| | | | |
|---|---|---|---|
| 6,239,716 B1 * | 5/2001 | Pross et al. | 340/815.4 |
| 6,628,085 B2 * | 9/2003 | Yang | 315/169.3 |
| 7,489,086 B2 | 2/2009 | Miskin et al. | |
| 7,501,772 B2 | 3/2009 | Chung et al. | |
| 7,649,326 B2 | 1/2010 | Johnson et al. | |
| 7,679,292 B2 | 3/2010 | Allen et al. | |
| 2004/0233145 A1 | 11/2004 | Chiang | |

(Continued)

FOREIGN PATENT DOCUMENTS

| | | |
|---|---|---|
| EP | 0955619 A1 | 11/1999 |
| EP | 0967590 A1 | 12/1999 |
| FR | 2901956 A1 | 12/2007 |
| WO | WO2009/013807 | 11/2009 |

*Primary Examiner* — Douglas W Owens
*Assistant Examiner* — Thai Pham
(74) *Attorney, Agent, or Firm* — Andrew Martin

(57) ABSTRACT

A device, system and method to drive light emitting diodes (LEDs) are disclosed. An exemplary system may include a string of LEDs coupled across a voltage source configured to provide an input voltage. The string of LEDs may include a plurality of separate groups of LEDs and a plurality of switch circuits. Each of the switch circuits may include a switch coupled in parallel with an associated one of the groups of LEDs to control current flow through the associated group of LEDs in response to a control signal from a controller circuit. A switch protection circuit may be associated with at least one of the switches. A steering circuit may also be coupled in series and associated with each of the groups of LEDs.

15 Claims, 4 Drawing Sheets

(56) References Cited

U.S. PATENT DOCUMENTS

| | | | |
|---|---|---|---|
| 2007/0262920 A1* | 11/2007 | Werner et al. | 345/46 |
| 2008/0094000 A1 | 4/2008 | Yamamoto et al. | |
| 2008/0157689 A1 | 7/2008 | Kato | |
| 2009/0066267 A1 | 3/2009 | Kraus et al. | |
| 2010/0134018 A1 | 6/2010 | Tziony et al. | |
| 2010/0194298 A1 | 8/2010 | Kuwabara | |
| 2010/0308739 A1 | 12/2010 | Shteynberg et al. | |
| 2011/0316441 A1* | 12/2011 | Huynh | 315/291 |

* cited by examiner ically, to driving circuits for solid state light sources.
HIGH EFFICIENCY, LOW ENERGY STORAGE DRIVER CIRCUIT FOR SOLID STATE LIGHT SOURCES

RELATED APPLICATIONS

This application claims the benefit of and priority to U.S. Provisional Application Ser. No. 61/449,982, filed Mar. 7, 2011, entitled "HIGH EFFICIENCY, LOW ENERGY STORAGE DRIVER CIRCUIT FOR SOLID STATE LIGHT SOURCES" the disclosures of which are hereby incorporated by reference in its entirety.

TECHNICAL FIELD

The present invention relates to lighting, and more specifi-

BACKGROUND

The development of solid state light sources, such as but not limited to light emitting diodes (LEDs), has led to use of such devices in various lighting applications and fixtures. In general, an LED is a current driven device, i.e. the brightness of the light output of an LED may be directly related to the current supplied to the LED. However, the current through an LED should be limited to a design maximum to avoid overcurrent damage or failure of the LED. In general, single LED light sources operate at only 2 to 4 volts and therefore require a low voltage power supply to power them. Furthermore, the current through the LED is strongly dependent on the applied voltage and also on the temperature of the LED. For this reason, LED light sources are typically powered by a ballast and/or driver that transforms the mainline voltage to a level useable by the LED light source, and also controls the current. An additional function of the ballast and/or driver is to condition the current drawn from the mains supply to present the mains with a high power factor load having low harmonic distortion.

In general, it is desirable to operate multiple LEDs in order to achieve a higher light level. In this case, strings of LEDs are connected in series and powered by a ballast and/or a driver that supply the voltage needed and maintain the desired current level. Such a ballast and/or driver is typically a complex piece of electronic equipment containing numerous inductors, power transistors, large electrolytic capacitors, and integrated circuits. Some of these components, particularly the capacitors, are not tolerant of elevated temperatures. Thus, the ballast and/or driver is often a life-limiting piece of the system. Additionally, such circuitry is typically expensive to produce. At the other extreme, a simple series resistor is an inexpensive way to power a series string of LEDs, but results in high harmonic distortion as the current waveform is not sinusoidal. Additionally, it is an inefficient circuit as the resistor dissipates power.

Unipolar driving of solid state light sources connected in series (e.g., a string of LEDs) is described in, for example, U.S. application Ser. No. 13/229,611 (by the same inventors of the current application). Using such a unipolar driver, the average intensity of the solid state light sources is not uniform along the string owing to differences in the power applied to each source as instantaneous string voltage changes. This requires special physical placement of the LEDs in any practical system so this intensity variation is masked.

SUMMARY

A device, system and method to drive light emitting diodes (LEDs) are disclosed. An exemplary system may include a string of LEDs coupled across a voltage source configured to provide an input voltage. The string of LEDs may include a plurality of separate groups of LEDs and a plurality of switch circuits. Each of the switch circuits may include a switch coupled in parallel with an associated one of the groups of LEDs to control current flow through the associated group of LEDs in response to a control signal from a controller circuit. A switch protection circuit may be associated with at least one of the switches. A steering circuit may also be coupled in series and associated with each group of LEDs.

Other embodiments may include one or more of the following variations. Each steering circuit may include a first steering diode in series with the associated group of LEDs and the associated switch circuit, and a second steering diode in series with the associated group of LEDs and the associated switch circuit and opposite polarity with the first steering diode. In another embodiment, each steering circuit may have the first steering diode with opposite polarity of a subsequent first steering diode of a subsequent steering circuit. In another embodiment, each steering circuit has said second steering diode with opposite polarity of a subsequent second steering diode of a subsequent steering circuit. In another embodiment, each steering circuit may have a first steering diode in series with the associated group of LEDs and the associated switch circuit, and a second steering diode in series with the associated group of LEDs and the associated switch circuit and opposite polarity with the first steering diode; and wherein each steering circuit has said first steering diode with opposite polarity of a subsequent first steering diode of a subsequent steering circuit.

In yet another embodiment, the switch protection circuit is configured to place the at least one of the switches into a conducting state in the event of failure of an LED in the associated group of LEDs, wherein the failure places the LED into an open state. In another embodiment, the at least one of the switches may be a metal-oxide-semiconductor field-effect transistor (MOSFET) and the switch protection circuit comprises a resistor electrically coupled between the drain and the gate of the MOSFET. In another embodiment, at least one of the groups of LEDs comprises a plurality of series connected LEDs. In another embodiment, a controller protection circuit is associated with the at least one of the switches, the controller protection circuit may be configured to isolate the controller circuit from a voltage applied across the at least one of the switches. In another embodiment, the controller circuit may include an operational amplifier circuit, a power supply circuit, and a harmonic distortion control circuit. The operational amplifier circuit may be configured to compare a signal representative of the current flow to a reference voltage representative of the input voltage and maintain a proportionality between the current flow and the input voltage by adjusting the control signal in response to the comparison. The power supply circuit may be configured to generate a direct current (DC) voltage from the input voltage and provide the DC voltage to a voltage supply terminal of the operational amplifier circuit. The harmonic distortion control circuit may be configured to inject a fraction of the DC voltage to augment the input voltage.

The present invention is not intended to be limited to a system or method that must satisfy one or more of any stated objects or features of the invention. It is also important to note that the present invention is not limited to the exemplary or primary embodiments described herein. Modifications and substitutions by one of ordinary skill in the art are considered to be within the scope of the present invention.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Embodiments as described herein provide a variety of advantages over the prior art. Embodiments reduce the operating electronics for a string of series connected solid state light sources (such as but not limited to LEDs, and including without limitation organic LEDs (OLEDs), polymer LEDs (PLEDs), light emitting polymers (LEPs), and the like) to lower complexity, cost, parts count, size, and energy storage, while achieving high efficiency, high power factor, and low harmonic distortion. These improvements also increase temperature tolerance and therefore improve reliability. Further improvements include the elimination of inrush current, instant light, and the ability to operate on a conventional "phase-cut" dimmer circuit.

Embodiments of the invention may be briefly summarized as follows. A series-connected string of solid state light sources, such as but not limited to LEDs, are applied across an alternating current (AC) mains power supply (e.g., but not limited to, mainline power from a conventional two-prong/three-prong wall socket). The LEDs are interconnected with signal diodes to steer the alternating current through each LED in the forward conduction direction only. Controlled switches, in the form of bipolar or MOSFET transistors or other semi-conductor devices, are connected so as to short individual LEDs or, in some embodiments, sub-strings of LEDs. These controlled switches may also be referred to herein as "shorting switches". A sufficient number of the controlled switches is opened at any moment, so as to match the instantaneous magnitude of the mains voltage to the voltage drop across the non-shorted LEDs of the string. Finally, a current control function is provided, either as an additional device in series with the LED string, or by partially opening one or more of the switch elements.

Figure 1:
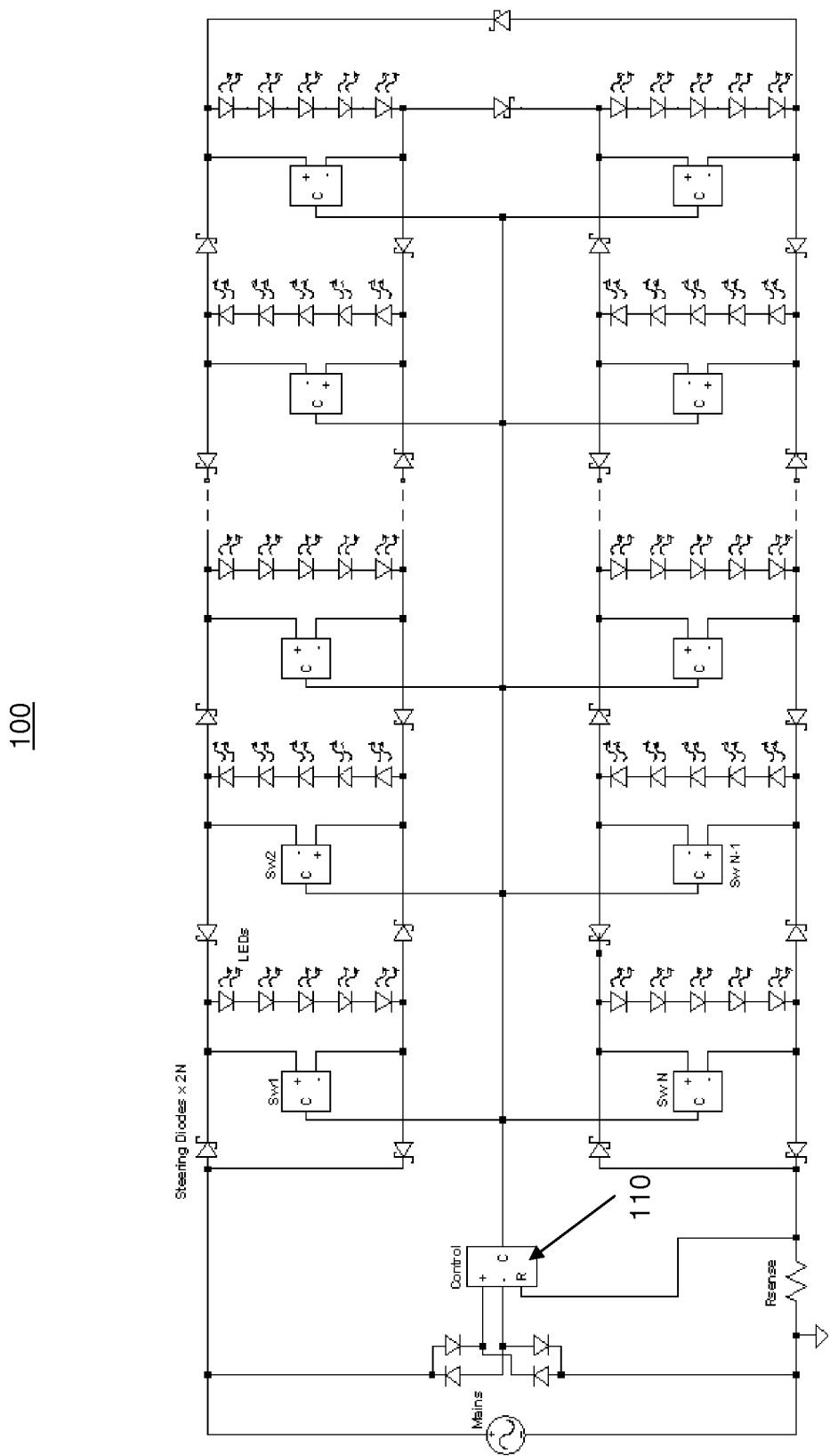
FIG. 1 shows a driving circuit for strings of series-connected solid state light sources, according to embodiments disclosed herein.

The shorting switches may be, and in some embodiments, are, connected as a string of series switches, shunting current around the associated LED or sub-string, as shown in a driving circuit 100 of FIG. 1. The shorting switches are identified in FIG. 1 as Sw1, Sw2, . . . SwN. Each shorting switch includes a pin "C", which is the control pin for that respective shorting switch. The shorting switches may be, and in some embodiments, are, controlled by a control circuit 110. In some embodiments, the control circuit 110 generates individual control signals for each shorting switch. In some embodiments, the control circuit 110 generates a single control signal for all the shorting switches. In some embodiments, the control circuit 110 generates a first control signal for a first subset of the shorting switches, and the control circuit 110 generates a second control signal for a second subset of the shorting switches, wherein the first subset and the second subset together comprise the entire set of the shorting switches. Of course, the control circuit 110 may be, and in some embodiments, is, configured so that a third control signal, a fourth control signal, and so on, are generated. In some embodiments, combinations of any of these may be used.

In embodiments where a single control signal is used for all the shorting switches, that control signal is connected directly to all the shorting switches, as shown in FIG. 1. In some embodiments, some or all of the shorting switches decide when to open or close, based on sensed voltage, or current, or combinations thereof. In some embodiments, one or more adjacent shorting switches may additionally provide one or more signals to a respective shorting switch, in order for that respective shorting switch to decide when to open or close. In some embodiments, combinations of these are used.

Thus, as briefly described above, in FIG. 1, there is a series-connected string of solid state light sources (such as but not limited to LEDs) with a corresponding string of series-connected shorting switches Sw1, Sw2, etc. The shorting switches are controlled by a common control signal, provided on the "C" pin of each shorting switch, from the control circuit 110. The LEDs are shown as being connected across the AC mains. Though the driving circuit 100 in FIG. 1 shows groups of LEDs, where each group comprises five series-connected LEDs, the invention is not so limited. That is, a group of LEDs may contain more or less than the five LEDs shown in FIG. 1.

The shorting switches, in some embodiments, are MOSFETs, while in other embodiments, the shorting switches are bipolar transistors. Of course, any type of electronic switch and/or combinations thereof may be, and in some embodiments are, used. Associated passive components are present as necessary to ensure proper operation. MOSFET switches are preferred, as their gate drive consumes less power. An example of an implementation of a switch sub-circuit appears in FIG. 2.

Figure 2:
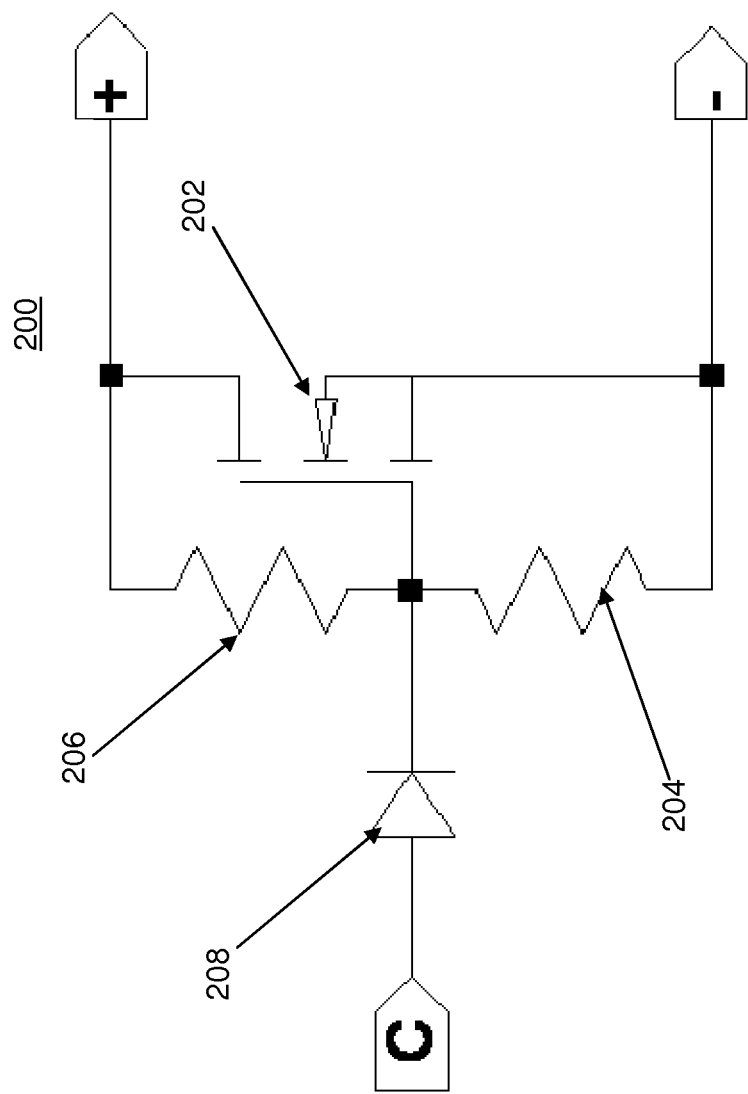
FIG. 2 illustrates a shorting switch sub-circuit, according to embodiments disclosed herein.

Thus, FIG. 2 shows a switch sub-circuit 200, which corresponds to one of the shorting switches Sw1, Sw2 . . . SwN shown in FIG. 1. The switch sub-circuit 200 composed of a MOSFET 202, a first resistor 204, a second resistor 206, and a diode 208. The first resistor 204 is connected between a gate and a source of the MOSFET 202, and is thus also referred to herein as a gate-source resistor 204. The gate-source resistor 204 ensures complete turn-off of the MOSFET 202 when one or more associated LED(s) connected across the source and the drain of the MOSFET 202 are emitting light. The second resistor 206 is connected between the gate and a drain of the MOSFET 202, and is thus also referred to herein as a gate-drain resistor 206. The gate-drain resistor 206 allows the MOSFET 202 to conduct in the event that the one or more associated LED(s) connected across the source and the drain of the MOSFET 202 fail to open. The diode 208 critically decouples the switch sub-circuit 200 from the control line (shown in detail in FIG. 1, and identified in FIG. 2 via pin "C") after the corresponding sub-string voltage rises above the control voltage.

The control circuit 110, shown in FIG. 1, determines the nature and magnitude of the current through the string of solid state light sources, such as but not limited to LED(s). It is essentially a feedback control loop, using sense resistors, such as but not limited to a sense resistor Rsense shown in FIG. 1, to monitor LED string current. The control circuit 110 then compares the monitored LED string current to a reference. In embodiments described herein, the reference is the time varying mainline voltage. This forces the current to track to the mainline voltage (i.e., the voltage from the mains power source), and hence, enforces a high power factor. Of course, in some embodiments, other references may be, and are, used to determine the time dependent current waveform.

In the embodiments described above with regards to FIGS. 1 and 2, the shorting switches fulfill a dual role of shorting non-operating solid state light sources (such as but not limited to LEDs) and controlling current. In other embodiments, these functions are separated by operating the switches fully on or off, and implementing the current control through a separate pass element attached in series with the string of solid state light sources (such as but not limited to LEDs).

Figure 3:
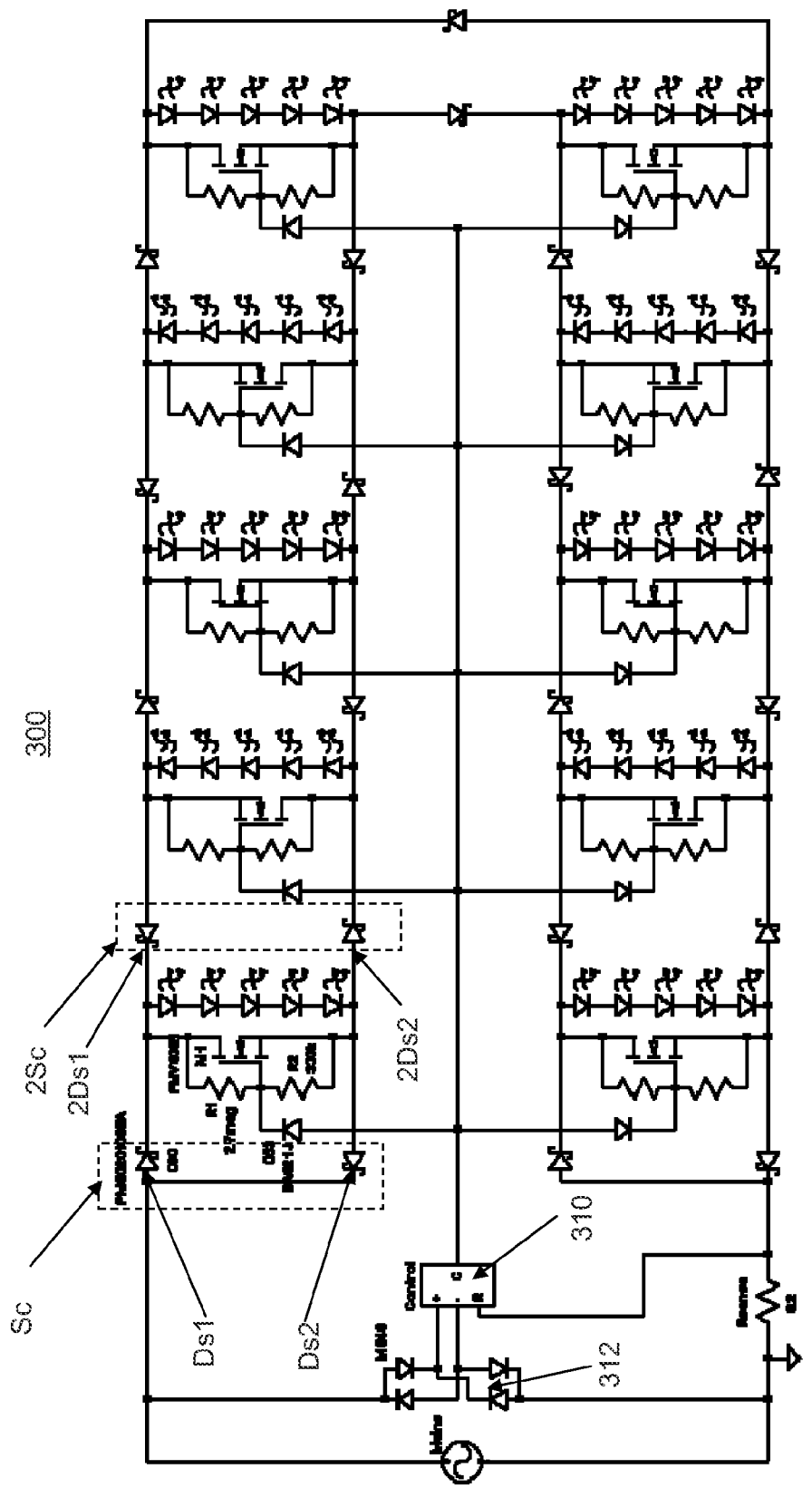
FIG. 3 shows another driving circuit for strings of series-connected solid state light sources, including a control circuit, according to embodiments disclosed herein.
Figure 4:
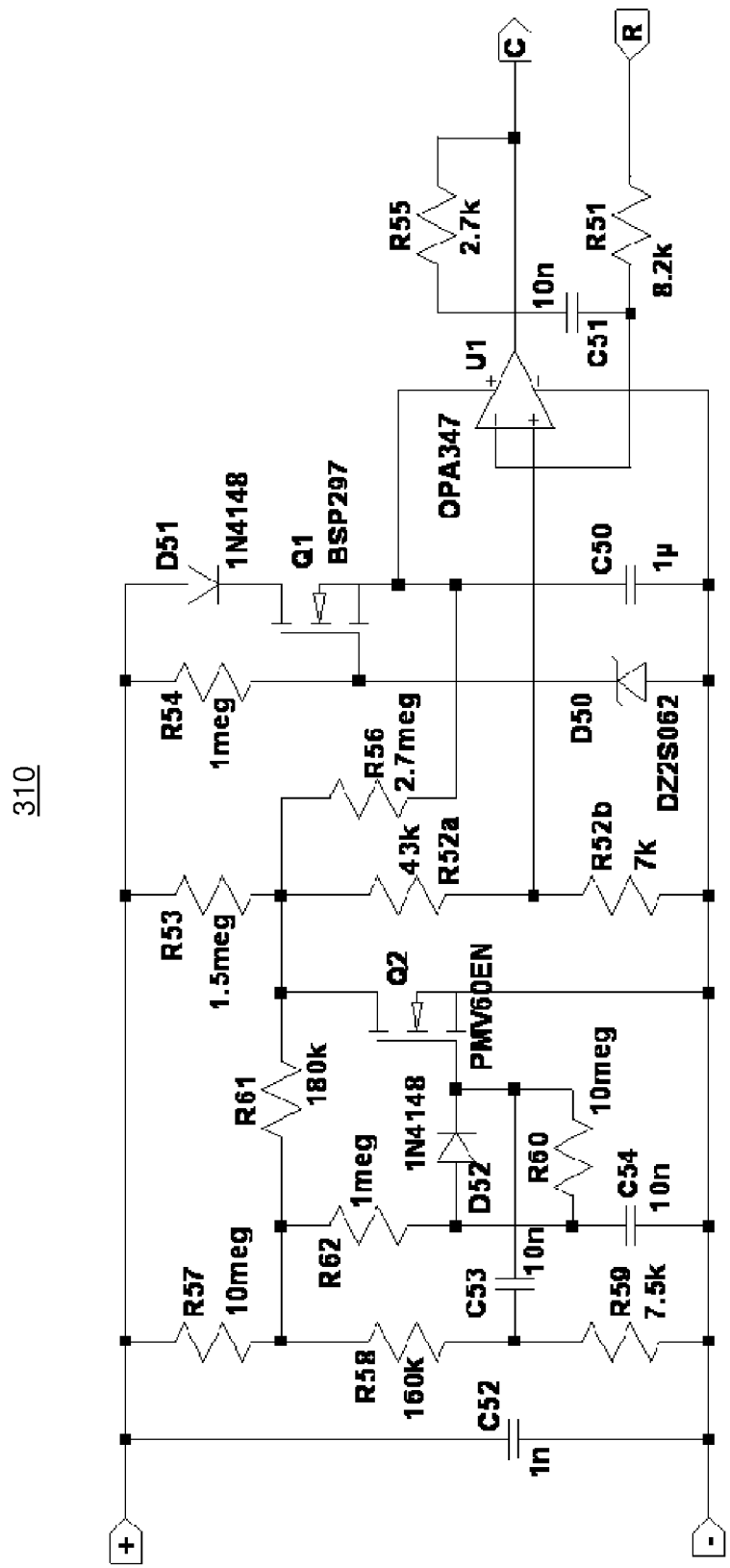
FIG. 4 illustrates the control circuit shown in FIG. 3 in more detail, according to embodiments disclosed herein.

FIGS. 3 and 4 show such an embodiment. In FIGS. 3 and 4, an array of series switch elements is employed. MOSFETs are used as the switches, though in other embodiments, other electronic switches may be, and are, used. A common control line connects the control circuit 310 of FIG. 3. The control circuit is shown in more detail in FIG. 4. In FIG. 4, the control circuit 310 includes a low current op-amp U1, which is connected to the gates of the MOSFETs through diodes, as shown in FIG. 3. Each MOSFET has a resistor connected from gate to source to help turn it off. An additional resistor connected from drain to gate forces the MOSFET to turn on if one or more of its associated solid state light sources (such as but not limited to LEDs), connected across the drain and the source of the MOSFET, fails in the open state. The function of the circuit is not changed (except for failure protection) if the drain-gate resistor is omitted.

In FIG. 3, a driving circuit 300 includes an array of MOSFETs connected as series switches with a common control signal, generated by the control circuit 310. The component values as shown for the first group of MOSFET and solid state light sources are the same for all remaining groups.

The driving circuit 300 also includes a rectifier 312. In the exemplary embodiment shown in FIG. 3, the rectifier 312 may only be required for powering the control circuit and incorporates less expensive components in view of the reduced current requirements for powering the control circuit. The rectifier 312 may also be incorporated into the control circuit of FIG. 4 allowing for greater flexibility in circuit and circuit board configurations. In another embodiment, the control circuitry can be powered by another/external source that may not require rectification. Accordingly, this embodiment may not require any rectifier circuitry.

In FIG. 4, the control circuit 310 of FIG. 3 is shown in more detail. All capacitors in the control circuit 310 are multilayer ceramic, and no inductors are used. The op-amp U1 is the central control element, comparing current through Rsense (shown in FIG. 3) with the AC line voltage.

The control circuit 310, as shown in FIG. 4, strives to maintain equality between the current through the string of solid state light sources (such as but not limited to LEDs), as sampled through R51 from the current sense resistor Rsense, and a fraction of the rectified mains signal at the junction between R52 and R53. In this way, the current and voltage waveforms are directly proportional to each other. RMS current (and therefore average power) may be, and in some embodiments, is, adjusted by varying the value of R52. Components R54, D50, D51, Q1 and C50 form a low voltage DC supply to power the op-amp U1. R55 and C51 tailor the frequency response of the op-amp U1 to avoid undesirable oscillations.

The function of the MOSFET string is as described herein. At any particular instantaneous mains voltage and phase, where the voltage is higher on the left side of the string of solid state light sources (such as but not limited to LEDs) than on the right side, there will be a MOSFET position, say number q, for which all MOSFETs to the left will be off, and all MOSFETs to the right will be on. Consequently, all LEDs to the left will be energized and all those to the right will be off. A steering circuit Sc comprising steering diodes, Ds1 and Ds2, which are found on each MOSFET string, ensure that current travels through each lit LED in the correct (forward) direction. The subsequent MOSFET string includes steering diodes 2Ds1 and 2Ds2. A subsequent steering circuit Sc2 comprising steering diodes 2Ds1 and 2Ds2 can be position with opposite polarity to steering diodes Ds1 and Ds2. Each respective MOSFET string can include respective steering diodes positioned in alternating fashion as shown in FIG. 3.

The sum of the voltage drops across the series string of energized LEDs will be slightly less than the rectified mains voltage, and the remaining voltage drop will fall across MOSFET q and its associated LEDs. This voltage drop will be insufficient to operate the LEDs at the full string current, so some of the current will be conducted by the MOSFET. Since there is a voltage drop across MOSFET q, the MOSFET to its left, say MOSFET p, will have a source voltage that is higher than that of MOSFET q. Since the gates of all the MOSFETs are fed from a common control line through gate diodes, the gate-to-source voltage of MOSFET p will be smaller than that of MOSFET q and it will conduct little or no current. A similar explanation applies to all the other MOSFETs to the left of MOSFET p. The gate diodes of the MOSFETs which are off will be reversed biased, and the gate-to-source resistors of these MOSFETs will pull the gate-to-source voltages to zero, ensuring that the MOSFETs are off. The control circuit 310 will adjust the control voltage to keep the overall string current at a specific level. If this level is low, the MOSFET to the right of MOSFET q, say MOSFET r, will start to increase its resistance. This will raise the source voltage of MOSFET q, and MOSFET q will start to turn off. In this way, MOSFET q and the control circuit 310 maintain the string current. If the mains voltage rises, more current will flow through the LEDs associated with MOSFET q, and less through MOSFET q. At some point, no current will be required through MOSFET q, and the control function will be passed to MOSFET r. When the AC voltage is of opposite polarity, the operation is the same with the words "right" and "left" reversed in the above description, and steering diodes Ds1 and Ds2, for each MOSFET string, ensuring that the LEDs are forward biased.

The embodiments described herein are an improvement on the prior art, particularly U.S. patent application Ser. No. 13/229,611, filed on Sep. 10, 2011, which must be powered from a rectified AC mains voltage. The prior art lacks the "steering diodes" Ds1-Ds2, which are key to the AC functioning of the LED string. Additionally, this invention obviates the need for a high voltage bridge rectifier, which contains four diodes. The steering diodes may be used herein to, for example, reduce intensity gradient of the LED string, and are low voltage devices of substantially lower cost.

Described herein is a novel method for driving a series string of LEDs with AC voltage efficiently with high power factor and low harmonic distortion, which exhibits substantially reduced parts count, cost, and physical size and increased reliability (due to absence of electrolytic capacitors) relative to traditional electronic circuits. It is also triac-dimmer compatible.

Of course, other circuit topologies than those described herein may be used without departing from the scope of the invention.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A system to drive light emitting diodes (LEDs) comprising:
    a string of LEDs coupled across a voltage source configured to provide an input voltage, the string of LEDs comprising a plurality of separate groups of LEDs;
    a plurality of switch circuits, each of the switch circuits comprising a switch coupled in parallel with an associated one of the groups of LEDs to control current flow through the associated group of LEDs in response to a control signal from a controller circuit;
    a switch protection circuit associated with at least one of the switches; and
    a steering circuit for each of the groups of LEDs wherein each steering circuit comprises a first steering diode in series with the associated group of LEDs and the associated switch circuit, and a second steering diode in series with the associated group of LEDs and the associated switch circuit.

2. The system of claim 1, wherein each steering circuit comprises the first steering diode in series with the associated group of LEDs and the associated switch circuit, and the second steering diode in series with the associated group of LEDs and the associated switch circuit and opposite polarity with the first steering diode.

3. The system of claim 1, wherein each steering circuit has said first steering diode with opposite polarity of a subsequent first steering diode of a subsequent steering circuit.

4. The system of claim 1, wherein each steering circuit has said second steering diode with opposite polarity of a subsequent second steering diode of a subsequent steering circuit.

5. The system of claim 1, wherein each steering circuit comprises the first steering diode in series with the associated group of LEDs and the associated switch circuit, and the second steering diode in series with the associated group of LEDs and the associated switch circuit and opposite polarity with the first steering diode; and wherein each steering circuit has said first steering diode with opposite polarity of a subsequent first steering diode of a subsequent steering circuit.

6. The system of claim 1, wherein the switch protection circuit configured to place the at least one of the switches into a conducting state in the event of failure of an LED in the associated group of LEDs, wherein the failure places the LED into an open state.

7. The system of claim 1, wherein the at least one of the switches comprises a metal-oxide-semiconductor field-effect transistor (MOSFET) and the switch protection circuit comprises a resistor electrically coupled between the drain and the gate of the MOSFET.

8. The system of claim 1, wherein at least one of the groups of LEDs comprises a plurality of series connected LEDs.

9. The system of claim 1, further comprising a controller protection circuit associated with the at least one of the switches, the controller protection circuit configured to isolate the controller circuit from a voltage applied across the at least one of the switches.

10. The system of claim 9, wherein the controller protection circuit comprises a diode.

11. The system of claim 1, wherein the controller circuit comprises:
    an operational amplifier circuit configured to compare a signal representative of the current flow to a reference voltage representative of the input voltage and maintain a proportionality between the current flow and the input voltage by adjusting the control signal in response to the comparison;
    a power supply circuit configured to generate a direct current (DC) voltage from the input voltage and provide the DC voltage to a power input of the operational amplifier circuit; and
    a harmonic distortion control circuit configured to inject a fraction of the DC voltage to augment the input voltage.

12. A method of driving LEDs, comprising:
    coupling a string of LEDs across a voltage supply configured to provide an input voltage, the string of LEDs comprising a plurality of separate groups of LEDs;
    configuring a plurality of switches, each of the switches being coupled in parallel with an associated one of the groups of LEDs for controlling current flow through the associated group of LEDs in response to a control signal from a controller circuit;
    associating a switch protection circuit with at least one of the switches, the switch protection circuit configured to place the at least one of the switches into a conducting state in the event of failure of an LED in the associated group of LEDs, wherein the failure places the LED into an open state; and
    directing the flow of current to each group of LEDs with a steering circuit for each of said groups of LEDs coupled in series with each associated the groups of LEDs wherein each steering circuit has a first steering diode directing the flow of current in the opposite direction of a subsequent first steering diode of a subsequent steering circuit.

13. The method of claim 12, wherein the directing the flow of current comprises the first steering diode directing the flow of current in series with the associated group of LEDs and the associated switch circuit, and a second steering diode directing the flow of current in series with the associated group of LEDs and the associated switch circuit and directing the flow of current opposite the first steering diode.

14. The method of claim 12, wherein each steering circuit has a second steering diode directing the flow of current in the opposite direction of a subsequent second steering diode of a subsequent steering circuit.

15. A system to drive light emitting diodes (LEDs) comprising:
    a string of LEDs coupled across a voltage source configured to provide an input voltage, the string of LEDs comprising a first group of LEDs and a second group of LEDs;
    a first switch circuit and a second switch circuit, each of the first and second switch circuits comprising a switch coupled in parallel with the associated one of the groups of LEDs to control current flow through the associated group of LEDs in response to a control signal from a controller circuit;

a switch protection circuit associated with each the first switch circuit and the second switch circuit;

a first steering circuit associated the first group of LEDs, comprising a first steering diode in series with the first group of LEDs and the associated switch circuit, and a second steering diode in series with the first group of LEDs and the associated switch circuit and opposite polarity with the first steering diode; and a second steering circuit associated the second group of LEDs, comprising a first steering diode in series with the second group of LEDs and the associated switch circuit, and a second steering diode in series with the second group of LEDs and the associated switch circuit and opposite polarity with the first steering diode wherein the first steering diode of second group of LEDs is in the opposite direction of the first steering diode of the first group of LEDs.

* * * * *